(12) United States Patent
Jung

(10) Patent No.: US 6,717,639 B2
(45) Date of Patent: Apr. 6, 2004

(54) REFLECTIVE LIQUID CRYSTAL DISPLAY DEVICE

(75) Inventor: Jin Hee Jung, Seoul (KR)

(73) Assignee: LG. Philips LCD Co. Ltd., Seoul (KR)

( * ) Notice: Subject to any disclaimer, the term of this patent is extended or adjusted under 35 U.S.C. 154(b) by 140 days.

(21) Appl. No.: 09/867,023

(22) Filed: May 30, 2001

(65) Prior Publication Data

US 2001/0050739 A1 Dec. 13, 2001

(30) Foreign Application Priority Data

May 30, 2000 (KR) .................................. P2000-29197

(51) Int. Cl.[7] ........................ G02F 1/1335; G02F 19/02
(52) U.S. Cl. ........................ 349/106; 349/115; 349/185
(58) Field of Search ................ 349/106, 115, 349/185

(56) References Cited

U.S. PATENT DOCUMENTS

| 5,555,114 A | * | 9/1996 | Narita et al. |
| 5,818,550 A | * | 10/1998 | Kadota et al. |
| 5,994,721 A | | 11/1999 | Zhong et al. ............... 257/89 |
| 6,365,916 B1 | * | 4/2002 | Zhong et al. |

FOREIGN PATENT DOCUMENTS

JP         08297280 A   *  11/1996

* cited by examiner

Primary Examiner—Ha Tran Nguyen
(74) Attorney, Agent, or Firm—Morgan Lewis & Bockius LLP

(57) ABSTRACT

An array substrate for a reflective liquid crystal display can include a substrate, thin film elements formed on the substrate, and color filters formed on the thin film elements. Each of the color filters preferably include a cholesteric liquid crystal. A pixel electrode can be formed on each of the color filters so that the pixel electrode corresponds to a respective color filter.

13 Claims, 7 Drawing Sheets

REFLECTIVE LIQUID CRYSTAL DISPLAY DEVICE

This application claims the benefit of Korean Application No. P00-29197, filed in the Republic of Korea on May 30, 2000, which is hereby incorporated by reference.

BACKGROUND OF THE INVENTION

1. Field of the Invention

This invention relates to a liquid crystal display device, and more particularly to a liquid crystal display having a reflective type display.

2. Description of the Related Art

A liquid crystal display (LCD) has many advantages. One advantage is that the LCD has a flat panel display. The flat display is advantageous because it is thin and not bulky. The LCD also has low power consumption. The LCD is used in many applications, for example, portable computers such as personal computer notebooks, office automation and audio-visual equipment. The LCD displays a picture or image when it manipulates an electric field that is applied to a liquid crystal material having a dielectric anisotropy to transmit or shut off a light. The LCD emits an external light rather than having a light generated from within, which is different from display devices such as electro-luminescence (EL) devices, cathode ray tubes (CRT), light emitting diodes (LED), and similar devices.

The LCD is largely classified into either a transmissive or reflective type display, depending on the manner in which the light is emitted. The transmissive LCD includes a liquid crystal panel having liquid crystal material injected between two glass substrates, and a back light for supplying a light to the liquid crystal panel. However, it is difficult to make a transmissive LCD, which is thin and light weight because of the added bulk and weight of the back light. Another drawback is that the back light causes excessive power consumption.

The reflective LCD has been widely used as a portable display device such as in an electronic passport or a personal data association (PDA) because it does not require a back light with low power consumption. The reflective LCD having less than sixteen scanning lines usually includes a twist nematic liquid crystal mode that has a 90° twist angle. The reflective LCD having more than sixteen scanning lines, however, usually includes a super twist nematic liquid crystal mode that engages a Diechroic polarizer or a phase compensating plate. The reflective LCDs that are available in the market have adopted a scheme where the device emits the difference between an electro-optical transmission curve of red, green, and blue by allowing $\Delta n \cdot d$ of the super twist nematics to be greater than 1.0 $\mu m$, or in the alternative, attaching color filters. A polarization-modulated type LCD that uses a polarizing plate and a reflecting plate that depends on a very large viewing angle, whereas a reflective LCD that uses an active matrix can realize various colors.

Referring to FIG. 1, the conventional reflective LCD includes a polarizer 2 for polarizing a natural light into a linear polarized light. The linear polarized light then transmits through a retardation film 4, which converts the linear polarized light into a circular polarized light. A glass substrate 6 transmits the circular polarized light to a color filter 8, which is arranged in red, green, and blue pixels. A liquid crystal layer 12 then converts the circular polarized light into a linear polarized light. A reflective plate 14 reflects light that passes through the liquid crystal layer 12.

As shown in FIG. 2A, when a voltage is not applied to the conventional reflective LCD, only a first linear polarized light 31 (e.g., S wave) found in an incident light 30 that is mingled in a natural light and a peripheral light transmits through the polarizer 2. The first linear polarized light 31 having transmitted through the polarizer 2 is then converted into a right-handed circularly polarized light 32 by means of a retardation film 4 having a phase difference value of $\lambda/4$. The right-handed circularly polarized light 32 transmits through the glass substrate 6 as it is. After the right-handed circularly polarized light 32 transmits through the glass substrate 6, it transmits through a red(R), green(G), or blue(B) color filter 8 of an absorptive color filter, thereby having a specific wavelength. The right-handed circularly polarized light 32 transmits through a liquid crystal layer 12 after having transmitted through the color filter 8.

The liquid crystal layer 12 having a phase difference value of $\lambda/4$ is injected into the liquid crystal display panel. It is changed into a second linear polarized light 33 (e.g., P wave) that is perpendicular to the first linear polarized light 31. The light changed into the second linear polarized light 33 is again forward-reflected by the reflective plate to be irradiated onto the liquid crystal layer 12. The irradiated second linear polarized light 33a is converted into a right-handed circularly polarized light 32a by transmitting through the liquid crystal layer 12. The right-handed circularly polarized light 32a then transmits through the absorptive color filter 8 again. After the right-handed circularly polarized light 32a has transmitted through the absorptive color filter 8, it is converted again into a first linear polarized light 31a by means of the retardation film 4. This first linear polarized light 31a transmits through the polarizer 2 to display a specific color on a screen (not shown) of the reflective LCD.

As shown in FIG. 2B, when a voltage is applied to the conventional reflective LCD, only a first linear polarized light found in an incident light 30 that is mingled in a natural light and a peripheral light transmits through the polarizer 2. The first linear polarized light 31 having transmitted through the polarizer 2 is then converted into a right-handed circularly polarized light 32 by means of a retardation film 4 having a phase difference value of $\lambda/4$. The right-handed circularly polarized light 32 then transmits through the glass substrate 6. After the right-handed circularly polarized light 32 transmits through the glass substrate 6, it transmits through a red(R), green(G), or blue(B) color filter 8 of an absorptive color filter. The right-handed circularly polarized light 32 is then irradiated onto the liquid crystal layer 12 in the state of a right-handed circularly polarized light having a specific wavelength. Since the liquid crystal layer 12 is supplied with a voltage current, the right-handed circularly polarized light 33 irradiated onto the liquid crystal layer 12 is also irradiated onto a reflective plate 14 in the same state, without any change.

The right-handed circularly polarized light 33 irradiated onto the reflective plate 14 is then converted into a left-handed circularly polarized light 33a having a phase change of 180° and reflected. The reflected left-handed circularly polarized light 33a is then irradiated onto the liquid crystal, which is injected into the liquid crystal panel. When the liquid crystal layer 12 is supplied with a voltage current, the left-handed circularly polarized light 32a irradiated onto the liquid crystal layer 12 then transmits through the absorptive color filter 8 in the same state, without any change. The left-handed circularly polarized light 32a transmitted through the absorptive color filter 8 is then converted into a second linear polarized light 31a by means of the retardation film 4. Light that is converted into the second linear-polarized light 31a fails to transmit through the polarizer 2 because the polarizer 2 is only capable of transmitting a first linear polarized light 31, thus, the screen of the reflective LCD is only allowed to be in a blackened state.

Conventional reflective LCDs are disadvantageous in that the absorptive color filter is positioned on the upper substrate. With the absorptive color filter positioned on the upper substrate, a natural or peripheral light must transmit through the color filter twice between the time it enters and exits the device. For this reason, the reflection efficiency of a light transmitting through the LCD panel is low. Even if the light efficiency is increased in conventional reflective LCDs by using color filters, the color purity is deteriorated because color filters that have poor purity must be used.

SUMMARY OF THE INVENTION

In view of the above problems a reflective liquid crystal display according to one aspect of the present invention can include an array substrate for a reflective liquid crystal display including a substrate, thin film elements formed on the substrate, and color filters formed on the thin film elements. Each of the color filters preferably includes a cholesteric liquid crystal. A pixel electrode can be formed on each of the color filters, wherein the pixel electrode corresponds to a respective color filter.

In another aspect, the reflective liquid crystal display device can include a first substrate, a retardation film disposed on the first substrate, and a polarizing plate disposed on the retardation film. A transparent electrode can be formed on the lower side of the first substrate. A lower plate preferably includes a second substrate, thin film elements formed on the second substrate, and color filters formed on the thin film elements. Each of the color filters preferably includes a cholestric liquid crystal. A pixel electrode can be formed on each of the color filters, wherein the pixel corresponds to a respective color filter. A liquid crystal layer can be filled between the first substrate and the second substrate.

DETAILED DESCRIPTION OF THE PREFERRED EMBODIMENTS

Figure 1:
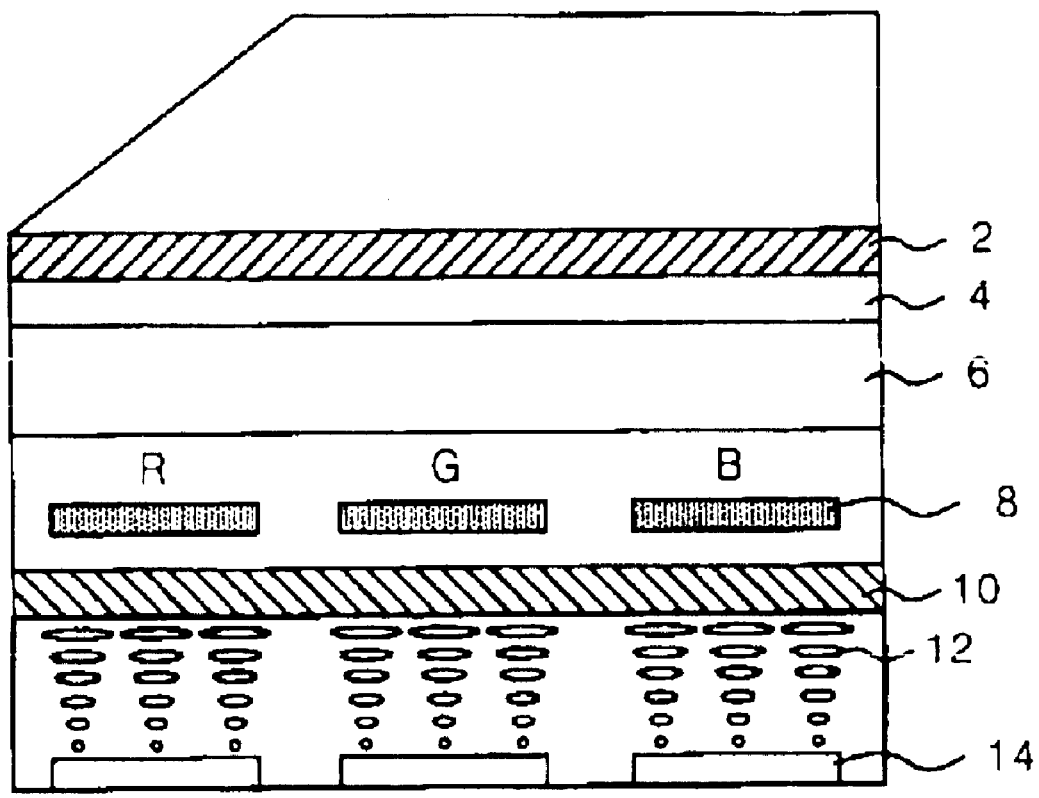
FIG. 1 is a schematic section view showing a structure of a conventional reflective liquid crystal display.
Figure 2A:
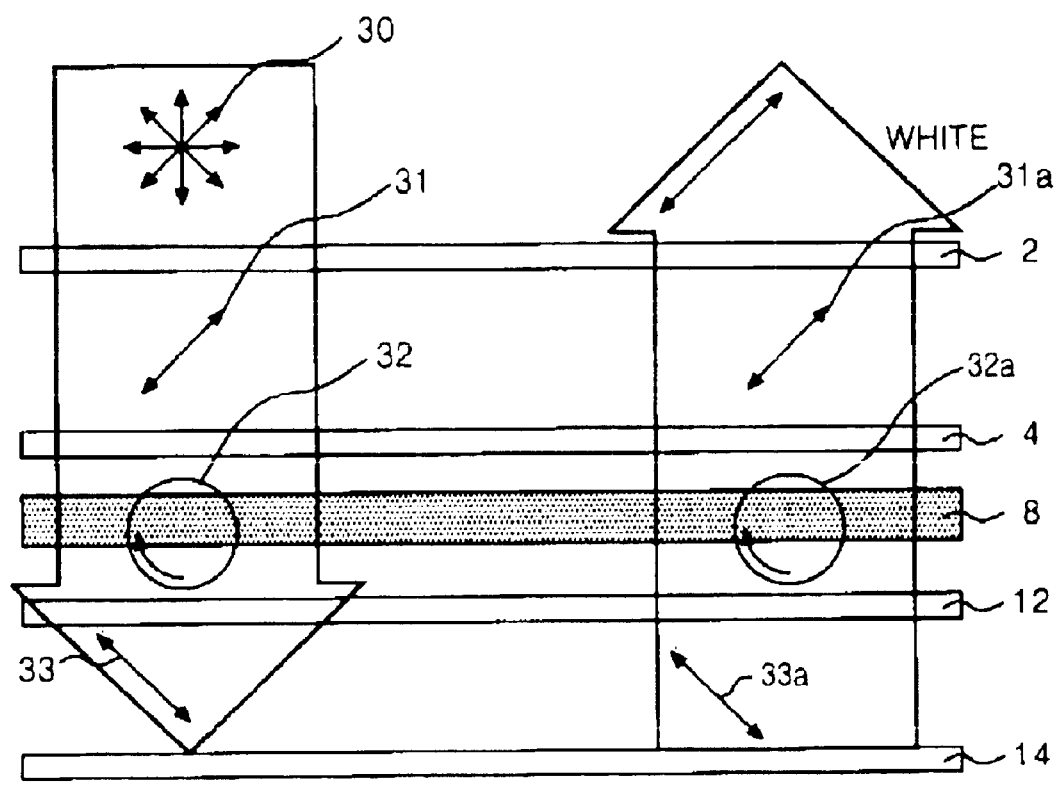
FIG. 2A depicts a driven state of the conventional reflective liquid crystal display shown in FIG. 1, without a voltage being applied.
Figure 2B:
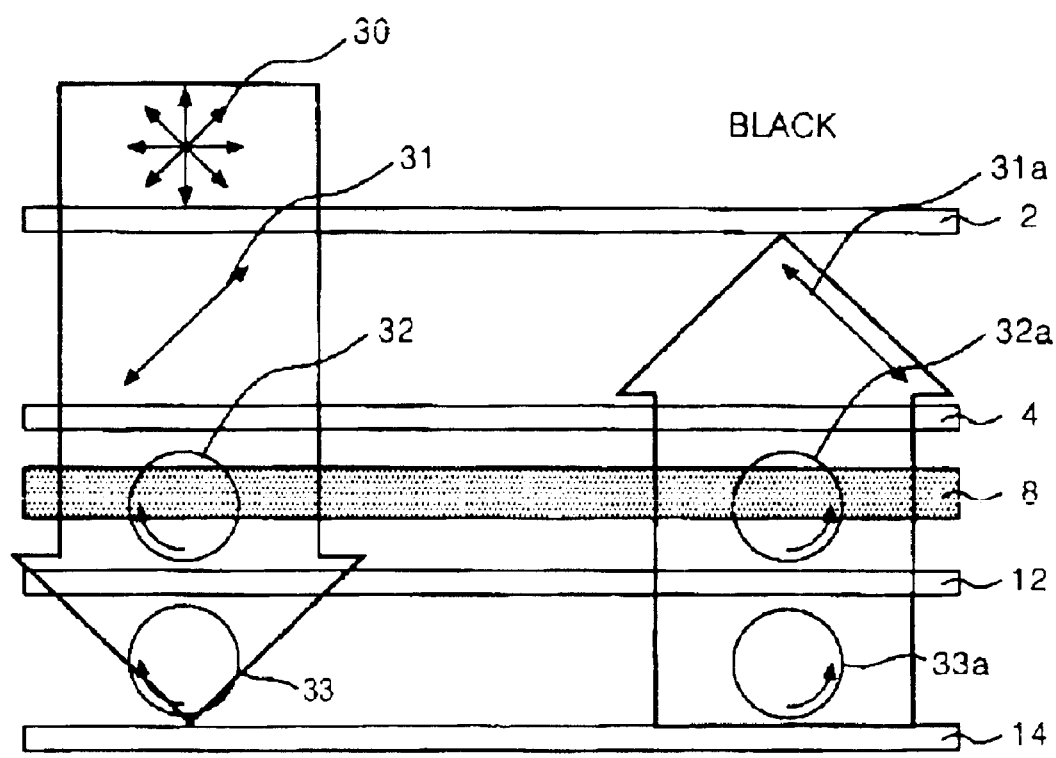
FIG. 2B depicts a driven state of the conventional reflective liquid crystal display shown in FIG. 1, with a voltage being applied.
Figure 3:
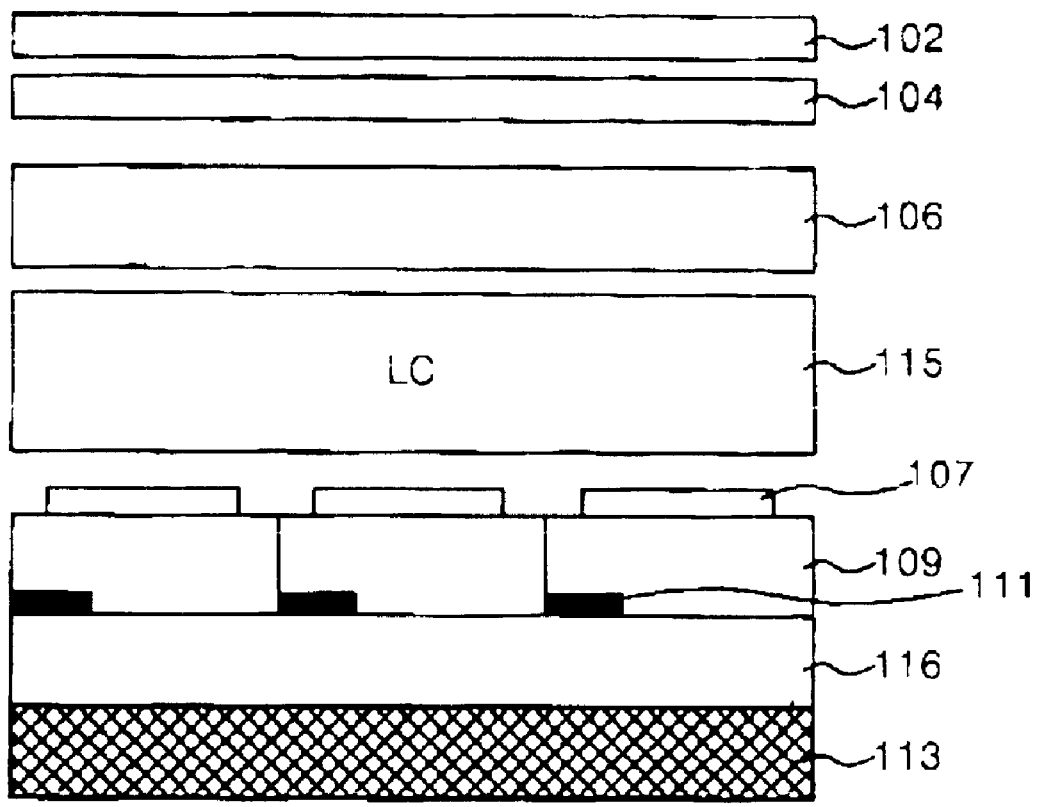
FIG. 3 is a schematic section view showing a structure of a reflective liquid crystal display according to an embodiment of the present invention.

Reference will now be made in detail to the preferred embodiments of the present invention, examples of which are illustrated in the accompanying drawings. Referring to FIG. 3, a reflective liquid crystal display (LCD) is illustrated according to a preferred embodiment of the present invention. The reflective LCD can include an upper plate mounted with a glass substrate 106, a retardation film 104, and a polarizer 102. The retardation film 104 can be adhered between the top surface of the glass substrate 106 and the lower surface of the polarizer 102. A transparent electrode (not shown), which can be manufactured from indium tin oxide (ITO), or an equivalent substance can be placed below the glass substrate 106. Reflective red, green and blue color filters 109 can be made from a polymerized cholesteric liquid crystal (CLC). These color filters 109 are preferably mounted on a lower plate including an absorptive plate 113, a glass substrate 116, and thin film elements 111. The thin film elements 111 can include switching devices (such as thin film transistors (TFT)), data lines, and gate lines. These thin film elements 111 can be disposed on the glass substrate 116. A color filter 109 and corresponding pixel electrode 107 are affixed above the thin film elements 111. The reflective color filters 109 preferably have a property that only reflects a right-handed circularly polarized light or a left-handed circularly polarized light while transmitting the remaining circular-polarized light. Further, the reflective color filters 109 can be manufactured such that each reflective color filter 109 is formed between a thin film element 111 and a pixel electrode 107 to serve as an insulating film. Subsequently, the pixel electrodes 107 that are formed on the reflective color filters 109 apply a voltage to a liquid crystal layer 115. The upper plate and the lower plate of the reflective LCD that are formed in this manner can be adhered to each other. A liquid crystal 115 having a phase difference value of $\lambda/2$ can be injected between the upper and lower plates. An alignment layer may be used when injecting the liquid crystal 115 between the upper and lower plates.

Figure 4A:
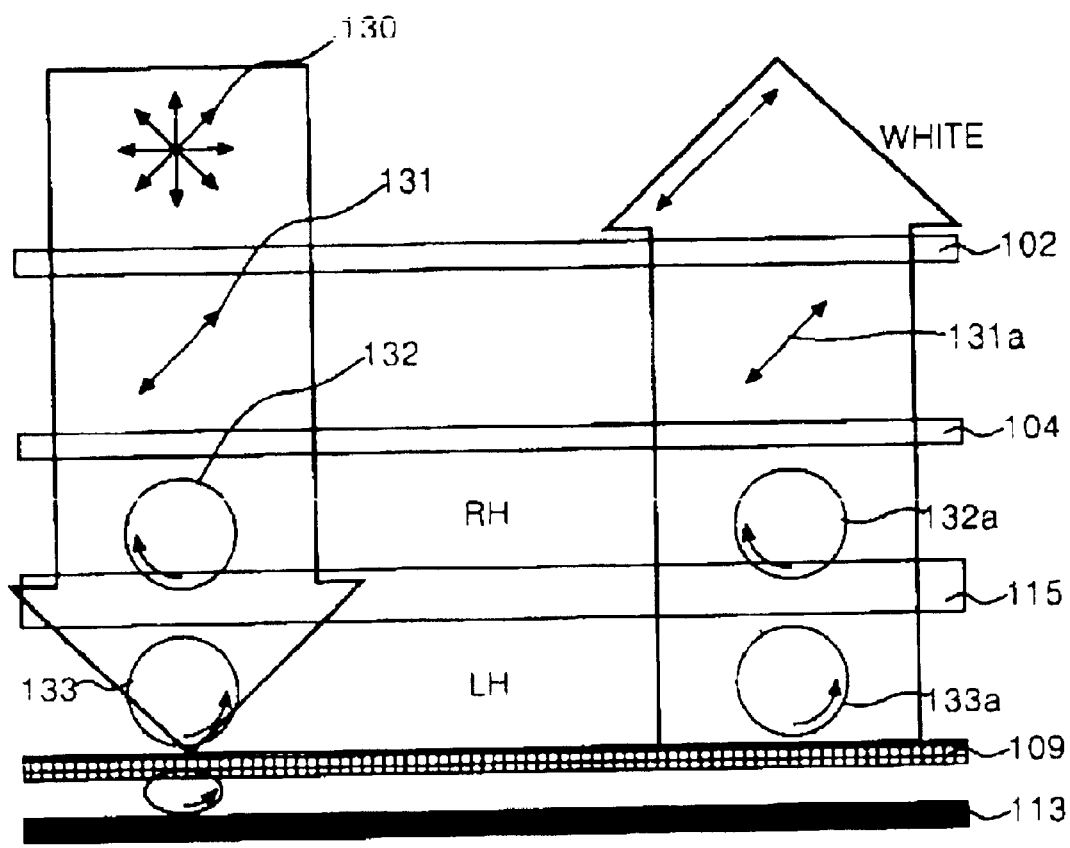
FIG. 4A depicts a driven state of the reflective liquid crystal display shown in FIG. 3, without a voltage being applied.

As shown in FIG. 4A, when a voltage is not applied to the reflective LCD according to a preferred embodiment, only a first linear polarized light 131 (e.g., S wave) found in an incident light 130 mingled in a natural light and a peripheral light transmits through the polarizer 102. The first linear polarized light 131 that has transmitted through the polarizer 102 can then be converted into a right-handed circularly polarized light 132 by means of the retardation film 104 having a phase difference value of $\lambda/4$. The right-handed circularly polarized light 132 can transmit through the glass substrate 106 as it is. After the right-handed circularly polarized light 132 transmits through the glass substrate 106, it transmits through the liquid crystal 115 having a phase difference value of $\lambda/2$ that converts it into a left-handed circularly polarized light 133. The light changed into the left-handed circularly polarized light 133 and irradiated onto the reflective color filters 109 reflects only a light of a specific wavelength and transmits light of the remaining wavelength, found in a reflection characteristic of a polymerized cholesteric liquid crystal which is a property of the reflective color filters 109.

The light having a specific wavelength can be reflected in a left-handed circularly polarized light 133a while the light having the remaining wavelength are absorbed through the absorptive layer 113. The light having the specific wavelength, in a left-handed circularly polarized light 133a can again be irradiated onto the liquid crystal layer 115 having a phase difference value of $\lambda/2$. The irradiated left-handed circularly polarized light 133a transmits through the liquid crystal layer 115 and can then be converted into a right-handed circularly polarized light 132a. The right-handed circularly polarized light 132a can transmit through the glass substrate 106 with no change and can be irradiated onto the retardation film having a phase difference value of λ/4. The right-handed circularly polarized light 132a irradiated onto the retardation film 104 can again be changed into the first linear polarized light 131a in the process of transmitting through the retardation film 104. The light changed into the first linear polarized light 131a transmits through the polarizer 102 to display a color of the specific cell on the screen of the reflective LCD.

Figure 4B:
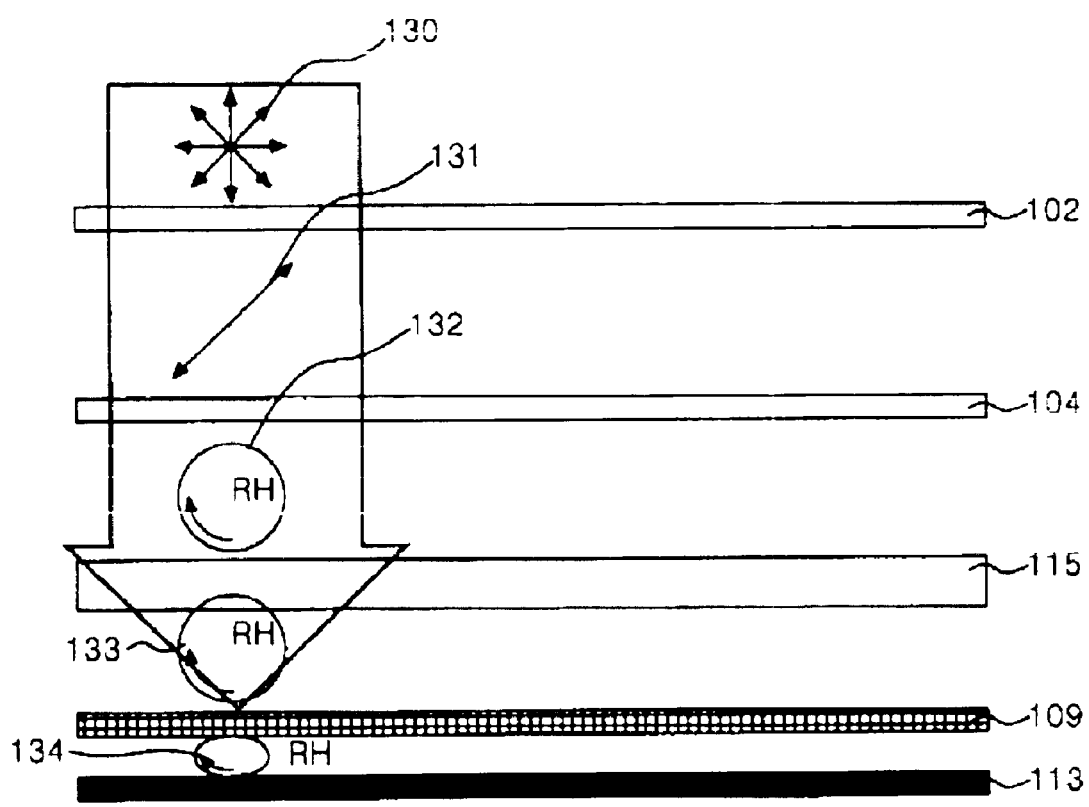
FIG. 4B depicts a driven state of the reflective liquid crystal display shown in FIG. 3, with a voltage being applied.

As shown in FIG. 4B, when a voltage is applied to the conventional reflective LCD, only a first linear polarized light found in an incident light 130 that is mingled in a natural light and a peripheral light transmits through the polarizer 102. The first linear polarized light 131 having transmitted through the polarizer 102 can then be converted into a right-handed circularly polarized light 132 by means of the retardation film 104 having a phase difference value of λ/4. The right-handed circularly polarized light 132 can transmit through the glass substrate 106 as it is. After the right-handed circularly polarized light 132 transmits through the glass substrate 106, it can be irradiated onto the liquid crystal layer 115. When the liquid crystal layer 115 is in a state having no phase difference value, the right-handed circularly polarized light 132 that is irradiated onto the liquid crystal 115 can then be irradiated on the reflective color filter 109 in the same state, without any change. The reflective color filter 109 transmits the entire right-handed circularly polarized light 133 since it was manufactured such that only a predetermined left-handed circularly polarized light should be reflected. Therefore, the right-handed circularly polarized light 133 that is irradiated onto the reflective color filter 109 transmits through the reflective color filter 109 as it is. The right-handed circularly polarized light 133 can then be entirely absorbed by the absorptive plate 113, thus, the screen of the reflective LCD is only allowed to be in a blackened state.

Figure 5:
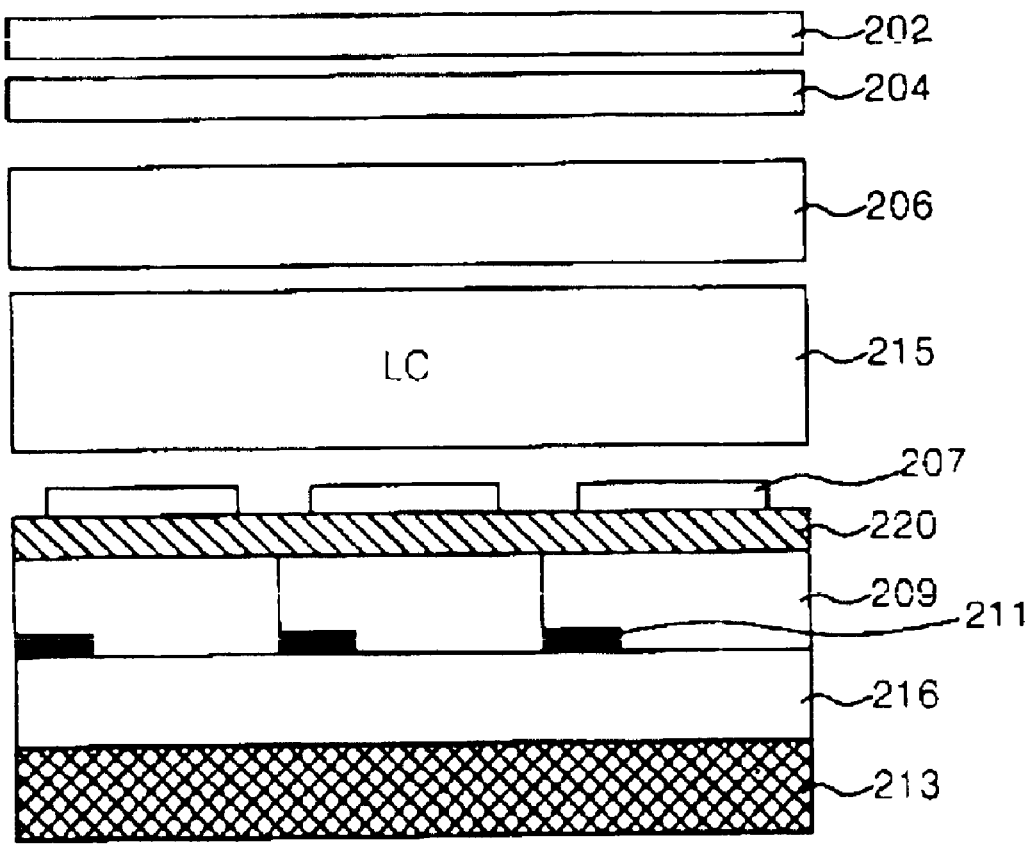
FIG. 5 is a schematic section view showing a structure of a reflective liquid crystal display according to another embodiment of the present invention.

Referring to FIG. 5, a reflective liquid crystal display (LCD) is illustrated according to another embodiment of the present invention. The reflective LCD in FIG. 5 has a similar driving characteristic as the reflective LCD that is illustrated in FIGS. 4A and 4B, and according to the embodiment shown in FIG. 3. Thus, a detailed explanation as to a driving characteristic of the reflective LCD according to this embodiment will be omitted.

In FIG. 5, the reflective LCD can include an upper plate mounted with a glass substrate 206, a retardation film 204, and a polarizer 202. The retardation film 204 can be adhered between the top surface of the glass substrate 206 and the lower surface of the polarizer 202. A transparent electrode (not shown), which can be manufactured from indium tin oxide (ITO), or an equivalent substance can be placed below the glass substrate 206. Reflective red, green and blue color filters 209 are preferably made from a polymerized cholesteric liquid crystal (CLC). These color filters 209 can be mounted on a lower plate including an absorptive plate 213, a glass substrate 216, and thin film elements 211. The thin film elements 211 can include switching devices (such as thin film transistors (TFT)), data lines, and gate lines. These thin film elements 211 are preferably disposed on the glass substrate 216. A color filter 209 and corresponding pixel electrode 207 can be affixed above the thin film elements 211. The reflective color filters 209 have a property that only reflects a left-handed circularly polarized light or a right-handed circularly polarized light while transmitting the remaining circular-polarized light. An insulating layer 220 can entirely cover the thin film elements 211 and the reflective color filters 209. The insulating layer 220 can be formed by deposition of an organic insulating material such as an acrylic organic compound, BCB (β-stagged-divinyl-siloxane-benzocyclobutene) or PFCB (perfluorocyclobutane), or an equivalent material. The insulating layer 220 can be provided on the reflective color filters 209 to protect and insulate the thin film elements 211 and the reflective color filters 209. The pixel electrodes 207 that apply a voltage to a liquid crystal layer 215 can then be formed on the insulating layer 220. The pixel electrodes 207 preferably contact the thin film elements 211 via contacting means, such as a hole, or similar structure. The upper and lower plate of the reflective LCD can be formed in this manner and subsequently adhered to each other. A liquid crystal layer 215 having a phase difference value of λ/2 can then be provided between the upper and lower plates. An alignment layer may be used when injecting the liquid crystal 215 between the upper and lower plates.

As described above and according to the present invention, the reflective color filters can be provided on the thin film elements that are formed on the lower plate of the reflective LCD. The insulating layer serves as a light reflecting device as well as an insulating film between each thin film element and each pixel electrode. Accordingly, the color purity and the brightness can be improved.

Although the present invention has been explained by the embodiments shown in the drawings described above, it will be apparent to those skilled in the art that the invention is not limited to those embodiments, but rather that various changes or modifications thereof are possible without departing from the spirit of the invention. Thus, it is intended that the present invention covers the modifications and variations of this invention provided they come within the scope of the appended claims and their equivalents.

What is claimed is:

1. A reflective liquid crystal display device comprising:
   a first substrate;
   a retardation film disposed on a first side of the first substrate;
   a polarizing plate disposed on the retardation film;
   a transparent electrode formed on a second side of the first substrate;
   a second substrate;
   thin film elements formed on the second substrate;
   color filters formed on the thin film elements, wherein each of the color filters includes a cholesteric liquid crystal;
   a pixel electrode formed on each of the color filters, wherein the pixel electrode corresponds to a respective one of the color filters; and
   a liquid crystal layer located between the first substrate and the second substrate, wherein when an incident light is transmitted from the first substrate through the liquid crystal layer onto the second substrate, the color filters reflect a light of a specific wavelength for displaying an image.

2. The device according to claim 1, further comprising an absorbing layer disposed on the lower side of the second substrate.

3. The device according to claim 1, wherein the thin film elements include a switching device having an electrode, and the pixel electrode is connected to the electrode of the switching device through a contact hole.

4. The device according to claim 1, wherein a phase difference value of the retardation film is λ/4.

5. The device according to claim 1, wherein a phase difference value in the liquid crystal is λ/2.

6. The device according to claim 1, further comprising:
a first alignment layer disposed between the first substrate and liquid crystal layer; and
a second alignment layer disposed between the second substrate and liquid crystal layer.

7. The device according to claim 1, further comprising an insulating film between the color filters and the pixel electrode.

8. An array substrate for a reflective liquid crystal display, comprising:
a substrate;
thin film elements formed on the substrate;
color filters formed on the thin film elements, wherein each of the color filters include a cholesteric liquid crystal; and
a pixel electrode formed on each of the color filters, wherein the pixel electrode corresponds to a respective one of the color filters, wherein when an incident light is transmitted onto the substrate, the color filters reflect a light of a specific wavelength for displaying an image.

9. The array substrate according to claim 8, further comprising:
an insulating layer between the color filters and the pixel electrode.

10. The array substrate according to claim 9, wherein the thin film elements include a switching device having an electrode, and the pixel electrode on the substrates is connected to the electrode of the switching device through a contact hole.

11. The array substrate according to claim 8, wherein the thin film elements include a switching device.

12. The array substrate according to claim 11, wherein the switching device is a thin film transistor.

13. The array substrate according to claim 8, wherein the thin film elements include a switching device having an electrode, and the pixel electrode on the substrates is connected to the electrode of the switching device through a contact hole.

* * * * *